United States Patent
Kim et al.

(10) Patent No.: US 7,770,978 B2
(45) Date of Patent: Aug. 10, 2010

(54) DETACHABLE ELECTRIC HEADREST

(75) Inventors: Sang Ho Kim, Incheon-si (KR); Chae Hoon Ma, Hwaseong-si (KR); Jin Ho Seo, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 12/323,439

(22) Filed: Nov. 25, 2008

(65) Prior Publication Data

US 2009/0273219 A1    Nov. 5, 2009

(30) Foreign Application Priority Data

Apr. 30, 2008    (KR) ............... 10-2008-0040558

(51) Int. Cl.
*A47C 1/10*    (2006.01)
(52) U.S. Cl. ................... 297/410; 297/391
(58) Field of Classification Search ............. 297/410, 297/391, 216.12
See application file for complete search history.

(56) References Cited

U.S. PATENT DOCUMENTS

| | | | |
|---|---|---|---|
| 4,639,041 A * | 1/1987 | Furukawa | 297/391 |
| 4,674,796 A * | 6/1987 | Weinich et al. | 297/391 |
| 5,131,720 A * | 7/1992 | Nemoto | 297/410 |
| 5,433,508 A | 7/1995 | Akima et al. | |
| 6,074,010 A * | 6/2000 | Takeda | 297/391 |
| 6,364,415 B1 * | 4/2002 | Mori et al. | 297/410 |
| 6,874,854 B2 * | 4/2005 | Terrand et al. | 297/410 |

FOREIGN PATENT DOCUMENTS

JP    5-56826 A    3/1993

* cited by examiner

*Primary Examiner*—David Dunn
*Assistant Examiner*—Erika Garrett
(74) *Attorney, Agent, or Firm*—Morgan, Lewis & Bockius LLP

(57) ABSTRACT

The detachable electric headrest includes a headrest pole, an ascending and descending slider, elastic pins, and locking bars. The headrest pole is configured such that engaging depressions are formed in the lower end portion thereof. The ascending and descending slider is provided with detachment depressions, into which the respective lower end portions of the headrest pole are inserted, and is mounted to the fastening bracket of a seat frame so as to be raised and lowered. The elastic pins are mounted in the respective detachment depressions so as to be inserted into the engaging depressions of the inserted headrest pole. The locking bars are configured such that cut depressions, in which the elastic pins can be moved, are formed in respective upper ends thereof, and are configured to be elastically supported to the ascending and descending slider.

7 Claims, 5 Drawing Sheets

DETACHABLE ELECTRIC HEADREST

CROSS-REFERENCE TO RELATED APPLICATION

The present application claims priority to Korean Application No. 10-2008-0040558 filed Apr. 30, 2008, the entire contents of which application is incorporated herein for all purposes by this reference.

BACKGROUND OF THE INVENTION

1. Field of the Invention

The present invention relates generally to an electric headrest, which can be easily attachably detached from a seat frame.

2. Description of Related Art

A typical vehicle headrest is mounted to the upper end of the back of a seat to support the head and neck area of a passenger. This headrest not only can prevent the head and neck portions from being damaged as the neck is moved backwards when a rear-end collision occurs, but also can provide comfort by coming into close contact with the head portion during normal driving.

The above-described headrest includes a pad, which is made of cushion material, and a headrest pole, which is connected to a seat frame. The height of a headrest is adjusted so as to match the height of the passenger using a mechanism that is connected to the seat frame so that the headrest pole can be raised and lowered.

Recently, an electric headrest that is capable of raising and lowering a headrest pole using a drive motor has been proposed. However, in the above-described electric headrest, there is a problem in that it is difficult to detach a headrest from a seat frame due to the electrical connection structure between the seat frame and the headrest. Furthermore, in the case where a folding function is applied to the electric headrest, there are problems in that the structure thereof becomes complicated, and in that there are technical difficulties in applying the folding function to the electric headrest.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an electric headrest, which can be easily attachably detached from a seat frame.

In an aspect, the present invention provides a detachable electric headrest that may include a headrest pole including engaging depression in lower end portion thereof, an ascending and descending slider provided with detachment depression, into which the lower end portion of the headrest pole is detachably inserted, and mounted to a fastening bracket of a seat frame so as to be raised or lowered, elastic member mounted in the detachment depression of the ascending and descending slider so as to be selectively inserted into the engaging depression of the inserted headrest pole, and/or locking bar including cut depression formed in upper end thereof and configured to be elastically supported by the ascending and descending slider, wherein the elastic member can be moved to cut depression of the locking bar.

The detachable electric headrest may further include a drive motor mounted to the fastening bracket, and/or a lead screw connected to the drive motor to operate in conjunction with the drive motor and engaged with the ascending and descending slider, thus raising or lowering the ascending and descending slider.

In another aspect of the present invention, when the ascending and descending slider is moved to its upper most position, the locking bar is pressed by an upper bracket of the seat frame to lower the cut depression, and/or when the headrest pole is detached from the detachment depression of the ascending and descending slider, ends of the elastic member are disengaged from the engaging depression of the headrest pole and moved to the cut depression and then returns to the detachment depression by a restoring force while the ascending and descending slider stays at its upper most position.

The elastic member may be an elastic pin having C-shaped cross section, and distance between prongs of the elastic pin is smaller than diameter of the lower end portion of the headrest pole.

The lower end portion of the headrest pole may be formed to have a tapered shape.

The detachment depression may be substantially conical to receive the lower end portion of the headrest pole.

The ascending and descending slider may be provided with guide rail, which is inserted into side portion of the fastening bracket to slide therein.

The fastening bracket may be provided with engaging portion, which is formed to protrude toward the ascending and descending slider in order to prevent the ascending and descending slider from being released from the fastening bracket at the lower most position of the ascending and descending slider.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
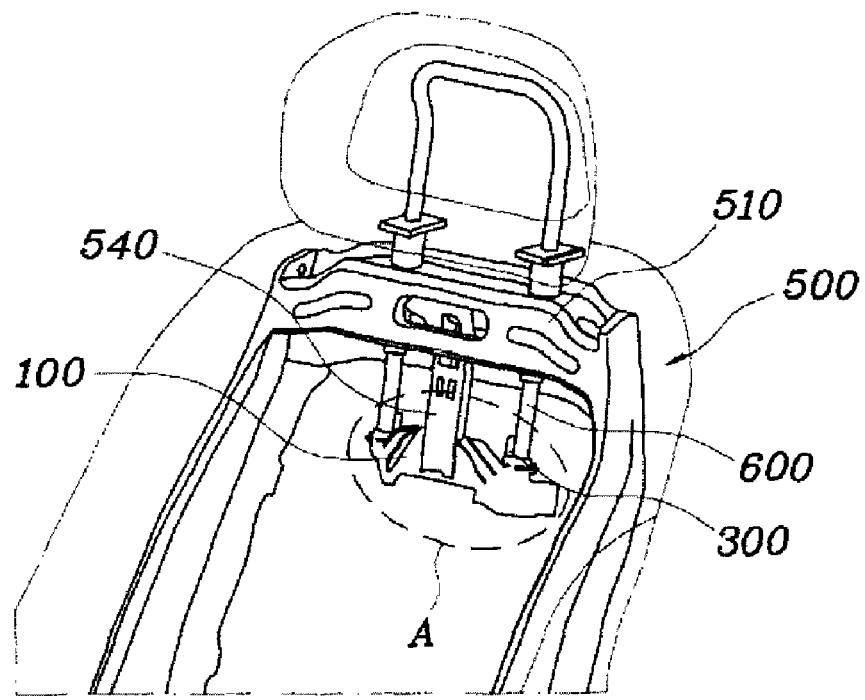
FIG. 1 is a view showing the construction of a vehicle seat, to which an exemplary detachable electric headrest according to the present invention is mounted.
Figure 2:
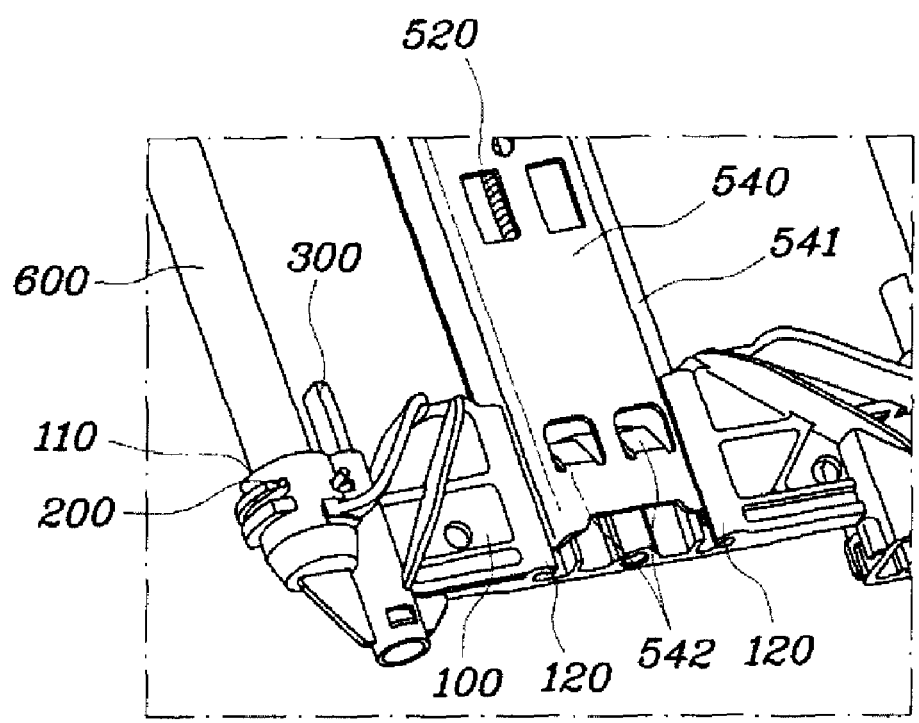
FIG. 2 is an enlarged view showing portion A of FIG. 1.
Figure 3:
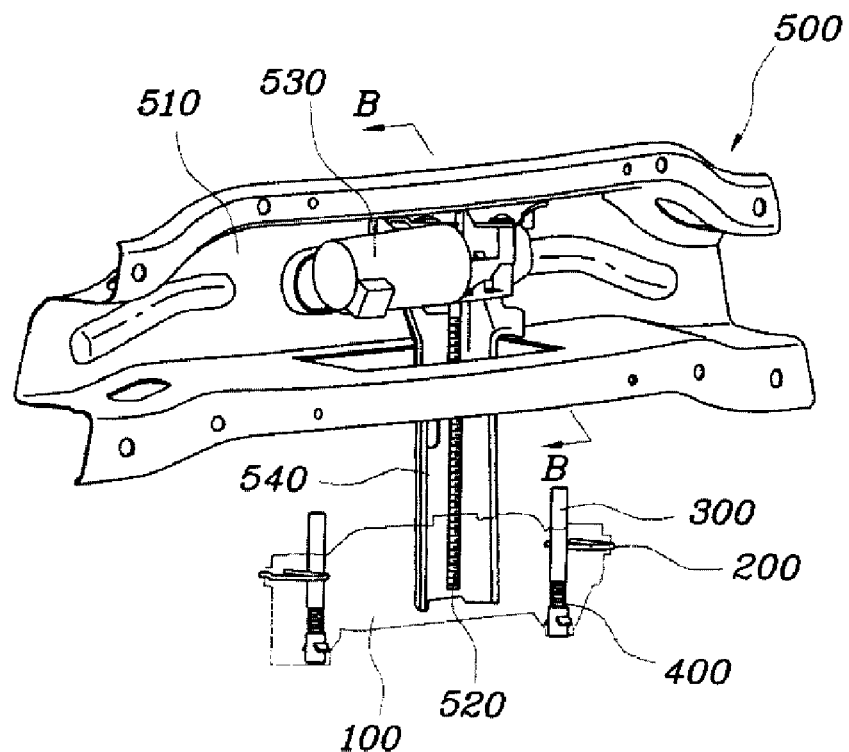
FIG. 3 is a view showing the construction of an exemplary detachable electric headrest according to aspect of the present invention.
Figure 4:
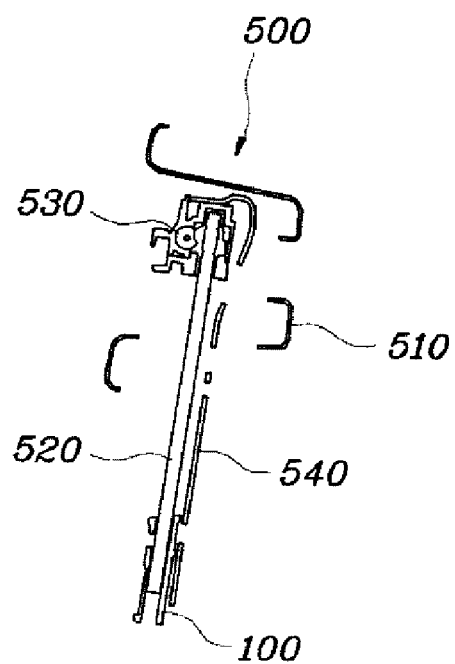
FIG. 4 is a sectional view taken along line B-B of FIG. 1.
Figure 5:
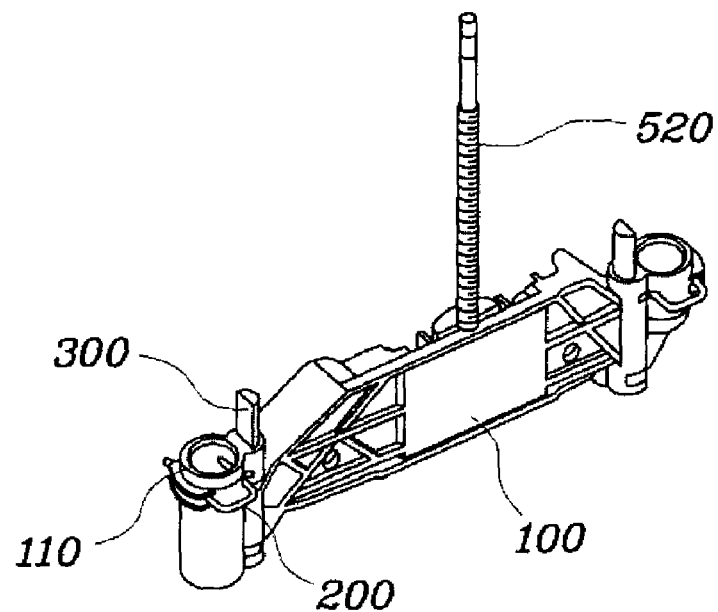
FIG. 5 is a perspective view showing an ascending and descending slider according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 1 to 5, an electric headrest according to the present invention is implemented to have a structure in which a headrest pole 600 is attachably detached from a seat frame 500 when an ascending and descending slider 100 is moved its uppermost position.

In greater detail, the ascending and descending slider 100 is mounted to the fastening bracket 540 of the seat frame 500 so as to be raised and lowered. The headrest pole 600 passes through the upper bracket 510 of the seat frame 500 to be inserted into the detachment depression 110 of the ascending and descending slider 100. Elastic pin 200 is mounted at a portion of the respective detachment depression 110 so as to engage the lower end portion of the headrest pole 600 therein. Locking bar 300 is provided with cut depression 310 to lock the elastic pin 200 so as to prevent the headrest pole 600 from moving. The elastic pin 200 is elastically supported by the ascending and descending slider 100 as explained later in detail. Thanks to the above-described construction, the headrest is attachably detached from the seat frame, so that the forward visibility of a rear seat passenger can be ensured, and thus comfortable riding can be achieved Both a drive motor 530, which is mounted to the upper bracket 510 via the fastening bracket 540, and a lead screw 520, which is connected to the drive motor 530 to operate in conjunction with the drive motor 530 and is also engaged with the central portion of the ascending and descending slider 100, are mounted to the seat frame 500. That is, when the lead screw 520 is rotated in response to the operation of the drive motor 530, the ascending and descending slider 100 may be moved upwards or downwards by the rotation of the lead screw 520.

The ascending and descending slider 100 is provided with guide rail 120, which is inserted into side portion of the fastening bracket 540 to slide. This guide rail 120 functions to guide the ascending and descending movement of the ascending and descending slider 100 when the lead screw 520 is rotated. In this case, sliding portion 541, into which guide rail 120 is inserted, is formed in the side portion of the fastening bracket 540. Furthermore, engaging portion 542 for preventing the ascending and descending slider 100 from being released downward is formed to protrude from the fastening bracket 540. This engaging portion 542 is configured to be bent in the direction in which the ascending and descending slider 100 is located, and to prevent the ascending and descending slider 100 from being released by engaging with the ascending and descending slider 100 when the ascending and descending slider 100 is lowered below a predetermined height.

The detachment depression 110, into which lower end portion of the headrest pole 600 is inserted, is provided in side portion of the ascending and descending slider 100. This detachment depression 110 is formed to have the shape of a cylindrical hole, the inside diameter of which corresponds to the outside diameter of the headrest pole 600. Furthermore, a portion of the respective elastic pin 200 for engaging the lower end portion of the headrest pole 600, which is inserted into the respective detachment depressions 110, is inserted into the detachment depression 110.

As shown in FIGS. 6 to 8A, the headrest pole 600 passes through the upper bracket 510 of the seat frame 500 so as to be detachably attached to the detachment depression 110 of the ascending and descending slider 100. It is preferred that the end of the headrest pole 600 be formed to have a tapered portion 620 so as to easily insert the headrest pole 600 into the detachment depression 110.

Engaging depression 610 is formed in the respective lower end portion of the headrest pole 600. The respective ends of the elastic pin 200 are engaged with the engaging depression 610, and a portion of the elastic pin 200 is pressed by a pressing portion 630 of the locking bar 300 so that the elastic pin 200 is inserted into the engaging depression 610 of the headrest pole 600. Accordingly the headrest pole 600 is prevented from being released downwards.

The elastic pin 200 has respective C-shaped cross sections so that ends thereof are inserted into the detachment depression 110 and so that the bent portion thereof is fastened to the ascending and descending slider 100. The ends of the elastic pin 200 prevent the headrest pole 600 from being moved upwards and downward by restricting the motions of the lower end portion of the headrest pole 600. The reason for this is because the elastic pin 200 is brought into close contact with side wall of the locking bar 300.

Figure 8A:
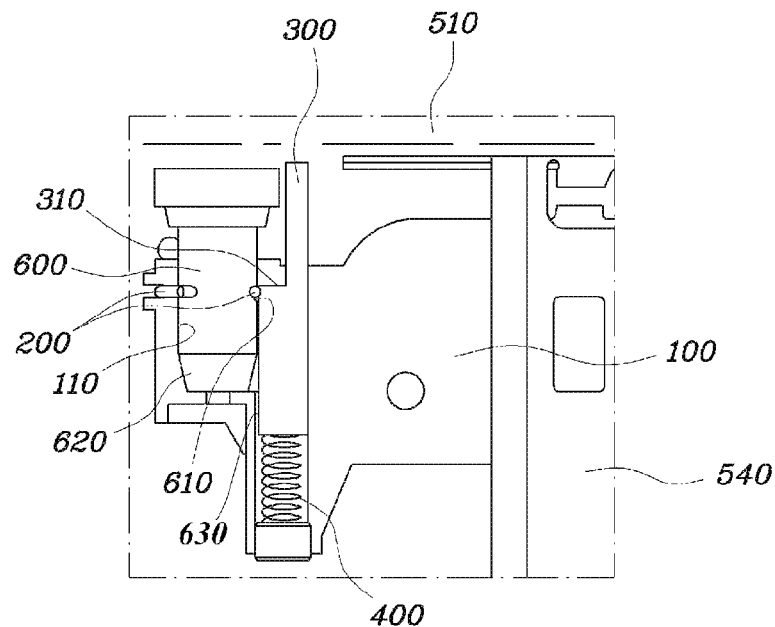
FIG. 8A is a view showing the state of an exemplary electric headrest before the headrest pole is detached according to the present invention.
Figure 8B:
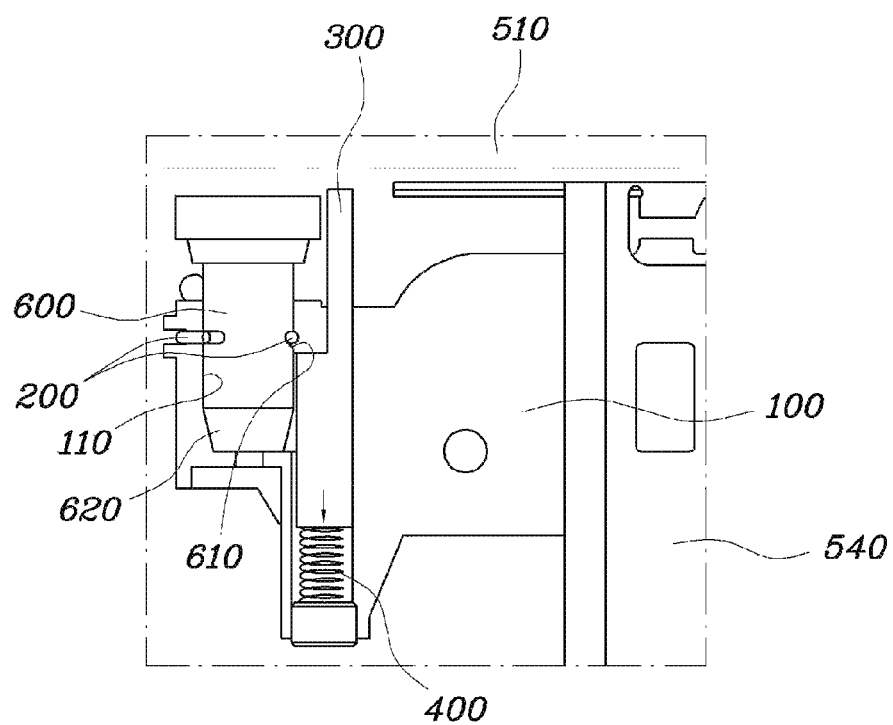
FIG. 8B is a view showing the state of an exemplary electric headrest after the headrest pole has been detached according to the present invention.

The locking bar 300 functions not only to prevent the headrest pole 600 from being released by bringing the side wall thereof into close contact with the elastic pin 200, but also to enable the headrest pole 600 to be detached by removing the engaging of the elastic pin 200 with the engaging depression 610 when the ascending and descending slider 100 is moved to the upper most position and when the upper end of the locking bar 300 is pressed by the upper bracket 510 of the seat frame 500 as shown in FIG. 8B.

For this purpose, elastic member 400 is mounted under the respective locking bar 300. The elastic member 400 enables elastic connection between the locking bar 300 and the ascending and descending slider 100. Furthermore, cut depression 310 is formed such that the elastic pin 200 can be moved when the upper ends of the locking bar 300 is pressed downwards and thus, the locking bar 300 is lowered.

As shown in FIG. 8B, the cut depression 310 is formed by cutting upper portion of the locking bar 300. This cut depression 310 provides a space in which the elastic pin 200 can be moved outwards when the ascending and descending slider 100 is moved to the upper most position and when the upper end of the locking bar 300 is pressed by the upper bracket 510.

That is, before the ascending and descending slider 100 is moved to the upper most position, the elastic pin 200 is brought into close contact with the respective side walls of the locking bar 300, thus fastening the headrest pole 600. In contrast, when the ascending and descending slider 100 is moved to the upper most position, the locking bar 300 is pressed downwards by the upper bracket 510 so that the elastic pin 200 is released from the engaging depression 610 while being open, and is moved to the cut depression 310 of the locking bar 300. However after then, the elastic pin 200 is moved into the detachment depression 110 by elastic restoring force after the headrest pole 600 is detached.

Meanwhile, when the headrest pole 600 is inserted into the detachment depression 110 of the ascending and descending slider 100 again, the locking bar 300 is already pressed downwards by the upper bracket 510. Accordingly, the ends of the elastic pin 200 are opened by the insertion of the headrest pole 600, and thus the elastic pin 200 is moved from the detachment depression 110 to the cut depression 310 and is then engaged with the engaging depression 610 of the headrest pole 600 by elastic restoring force. In this case, the lower end portion of the headrest pole 600 is formed to have the tapered portions 620, so that the headrest pole 600 can be easily inserted into the detachment depression 110.

Figure 6:
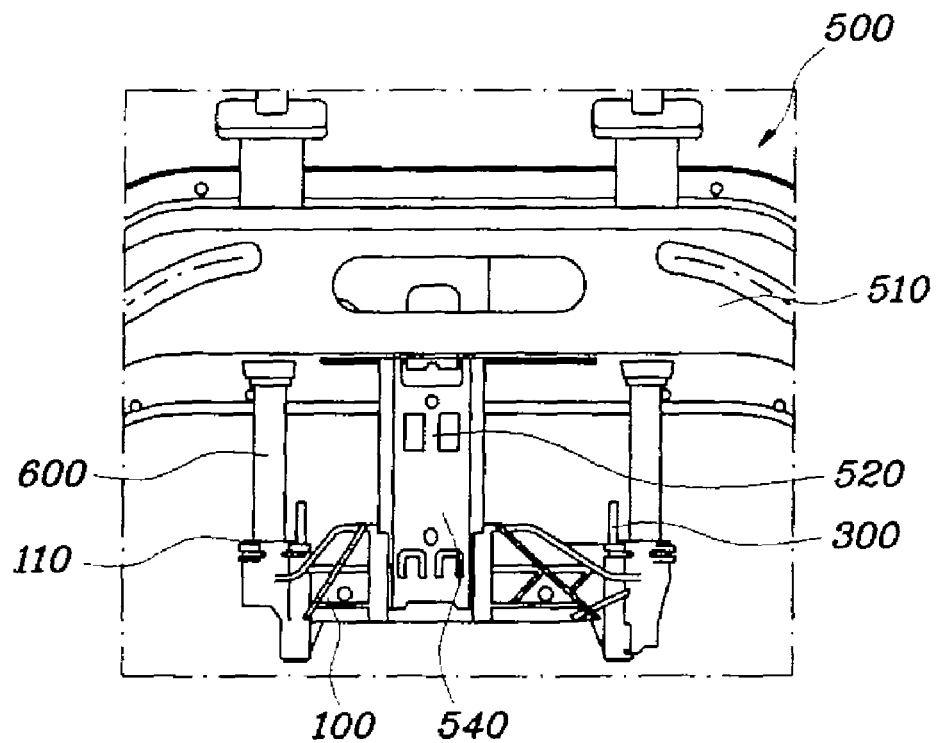
FIG. 6 is a front view showing an exemplary detachable electric headrest according to the present invention.
Figure 7:
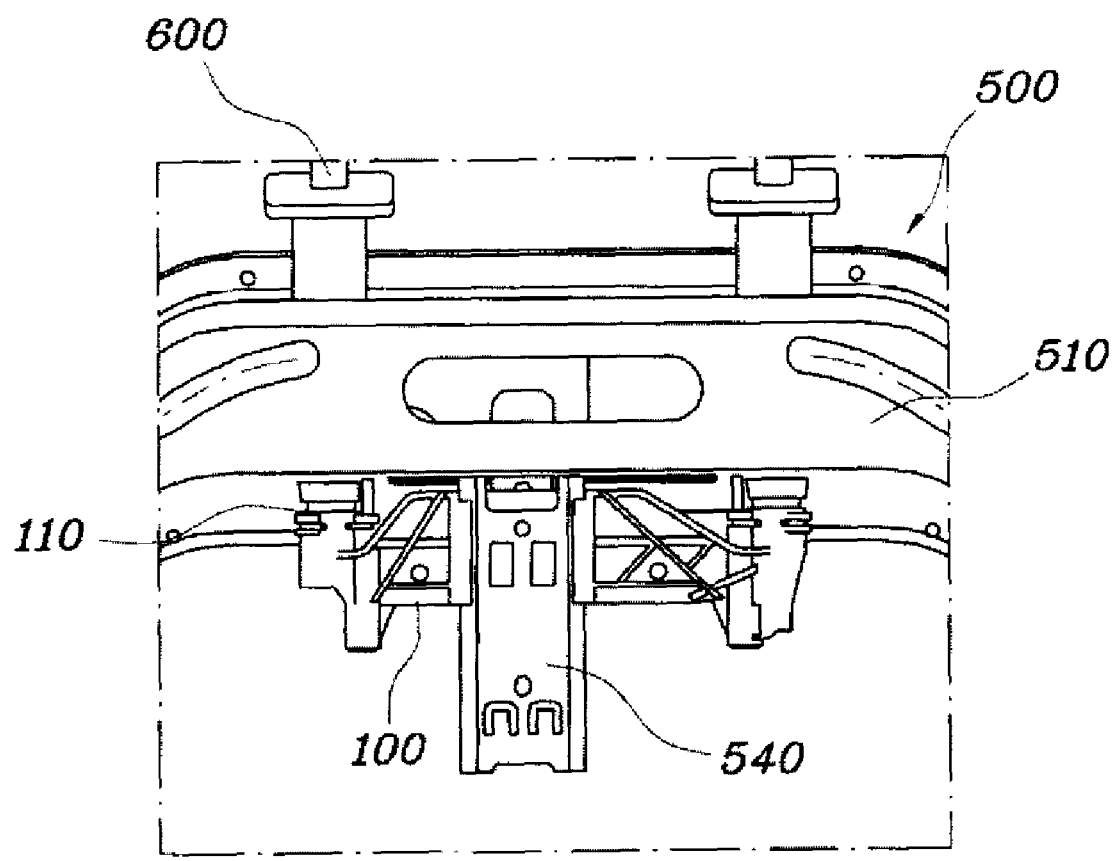
FIG. 7 is a view showing the state in which an ascending and descending slider of an exemplary detachable electric headrest according to the present invention is moved to its uppermost position.

Subsequently, as shown in FIG. 6, when the ascending and descending slider 100 located at the upper most position is moved downwards in the state in which the elastic pin 200 is engaged with the engaging depression 610 of the headrest pole 600, the compressed elastic member 400 is extended, and thus the locking bar 300 is raised. Thereafter, the side wall of the locking bar 300 is brought into close contact with the elastic pin 200 by the ascending of the locking bar 300, and thus the elastic pin 200 is fastened. Accordingly, the headrest pole 600 is prevented from being released.

As described above, the present invention is advantageous in that the headrest, the ascending and descending operations of which are electrically performed, is easily attachably detached from the seat frame, so that the front visibility of a rear seat passenger can be ensured, and thus comfortable riding can be achieved. Furthermore, the present invention is advantageous in that, when it is desired to apply a folding function to an electric headrest, the difficulties that occur when the function is applied can be solved using a simple detachable structure, and thus the commercial value of the product can be improved.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A detachable electric headrest, comprising:
    a headrest pole including an engaging depression formed in a lower end portion thereof;
    an ascending and descending slider provided with a detachment depression, into which the lower end portion of the headrest pole is detachably inserted, and mounted to a fastening bracket of a seat frame so as to be raised or lowered;
    an elastic member mounted in the detachment depression of the ascending and descending slider so as to be selectively inserted into the engaging depression of the inserted headrest pole; and
    a locking bar slidably coupled to and elastically supported by the ascending and descending slider, wherein the locking bar includes:
    a pressing portion by which at least a portion of the elastic member is urged into the engaging depression of the headrest pole; and
    a cut depressed portion into which the elastic member is moved by a restoring force thereof so that the elastic member is disengaged from the engaging depressions of the headrest pole;
    wherein, when the ascending and descending slider is moved to an upper most position thereof, the locking bar is pressed by an upper bracket of the seat frame and thus slid to a lowered position thereof so that the elastic member moves into the cut depressed portion of the locking bar by the restoring force thereof and unlocks the headrest pole from the ascending and descending slider.

2. The detachable electric headrest as set forth in claim 1, further comprising:
    a drive motor mounted to the fastening bracket; and
    a lead screw connected to the drive motor to operate in conjunction with the drive motor and engaged with the ascending and descending slider, thus raising or lowering the ascending and descending slider.

3. The detachable electric headrest as set forth in claim 1, wherein the lower end portion of the headrest pole is formed to have a tapered shape.

4. The detachable electric headrest as set forth in claim 1, wherein the detachment depression is substantially conical to receive the lower end portion of the headrest pole.

5. The detachable electric headrest as set forth in claim 1, wherein the ascending and descending slider is provided with guide rail, which is inserted into side portion of the fastening bracket to slide therein.

6. The detachable electric headrest as set forth in claim 1, wherein the fastening bracket is provided with engaging portion, which is formed to protrude toward the ascending and descending slider in order to prevent the ascending and descending slider from being released from the fastening bracket at the lower most position of the ascending and descending slider.

7. A passenger vehicle comprising a seat including a seat frame and the detachable electric headrest as set forth in claim 1.

* * * * *